(12) United States Patent
Mitchell (10) Patent No.: US 6,745,822 B1
(45) Date of Patent: Jun. 8, 2004

(54) CONCENTRIC FOIL STRUCTURE FOR REGENERATORS

(76) Inventor: Matthew P. Mitchell, 151 Alvarado Rd., Berkeley, CA (US) 94705

( * ) Notice: Subject to any disclaimer, the term of this patent is extended or adjusted under 35 U.S.C. 154(b) by 819 days.

(21) Appl. No.: 09/084,042

(22) Filed: May 22, 1998

(51) Int. Cl.⁷ .............................................. F28D 17/00
(52) U.S. Cl. ................... 165/10; 165/4; 62/6
(58) Field of Search ............................. 165/4, 10, 165, 165/166; 62/6

(56) References Cited

U.S. PATENT DOCUMENTS

| | | | | |
|---|---|---|---|---|
| 8,487 A | * | 11/1851 | Ingalls | 165/166 |
| 2,267,619 A | * | 12/1941 | Ström | 165/10 X |
| 3,373,798 A | * | 3/1968 | Brummett | 165/10 |
| 3,384,157 A | * | 5/1968 | Vonk et al. | 165/10 |
| 3,463,222 A | * | 8/1969 | Grames | 165/10 |
| 3,468,634 A | * | 9/1969 | Pauletta | 165/165 X |
| 3,491,184 A | * | 1/1970 | Rietdijk | 165/165 |
| 3,907,028 A | * | 9/1975 | Lawson | 165/165 X |
| 3,910,344 A | * | 10/1975 | Hagen | 165/10 |
| 4,084,633 A | * | 4/1978 | Strindehag | 156/10 X |
| 4,200,441 A | * | 4/1980 | Hönmann et al. | 165/10 X |
| 5,429,177 A | * | 7/1995 | Yaron et al. | 165/10 |

FOREIGN PATENT DOCUMENTS

JP        62-41954    *  2/1987  .................... 165/4

* cited by examiner

*Primary Examiner*—Christopher Atkinson

(57) ABSTRACT

A regenerator 24 formed of concentric layers of regenerator foil 61 assembled with unbonded joints 68 and 70 inside a generally cylindrical space 74 and method of inserting and installing foil 60 using foil rolling apparatus 16 and foil installation apparatus 22 employing an inflatable bladder 94 to press foil 60 against the wall of generally cylindrical space 74.

12 Claims, 6 Drawing Sheets

CONCENTRIC FOIL STRUCTURE FOR REGENERATORS

BACKGROUND—FIELD OF INVENTION

This invention relates to regenerators including regenerators for regenerative gas cycle machinery.

BACKGROUND—DESCRIPTION OF PRIOR ART

Regenerative gas cycle machines are a class machinery that includes Stirling cycle engines and Stirling cycle, Gifford-McMahon and pulse tube refrigerators. A regenerator is a critical component of all regenerative gas-cycle machines. In theory, a parallel-plate configuration offers a more favorable relationship between heat transfer and pressure drop than any other regenerator configuration, maximizing effectiveness. To make a parallel plate regenerator with the tight flow passages required for service in regenerative gas cycle machinery, spaced layers of foil have been tried. In practice, performance of foil regenerators has been disappointing. In part, that disappointing performance is due to difficulty in creating and assembling foil regenerators with uniform flow channels.

Stirling cycle machines, including both engines and refrigerators, have been constructed with annular regenerators surrounding the cylinder housing the displacer. Those regenerators have been constructed with a continuous spiral wrap of solid metal foil using dimples in the metal to separate the layers from each other. However, because it is difficult to create dimples of uniform depth and because there can be no cross-flow through the solid foil to adjust pressure differences between different layers, uniform flow patterns have not been achieved and performance of foil regenerators has been limited.

Attempts have been made to fashion regenerators from foil layers separated by spacers such as strings or layers of photoresist material. Those efforts have not proven to be satisfactory. Photoresist tends to flake off of the foil and be carried to other parts of the machine, contaminating it. Strings likewise tend to come loose.

Some of the problems of foil regenerators are met by using a photoetched sculpted foil regenerator disclosed in U.S. Pat. No. 5,429,177, which allows cross-flows through perforations in the layers of foil. However, it is difficult to make regenerator foil in lengths exceeding about 1 meter by batch processes of photoetching and prohibitively expensive to make it in small quantities in continuous form. For best performance, all regenerator foil should be of the same density. However, it is difficult to make large pieces of phototetched regenerator foil of uniform density. If a spiral-wrapped foil regenerator requires more foil than can be etched in a single strip, then two or more strips must be spliced end-to-end. Splicing foils end-to-end is difficult because the foils are thin and delicate, thus difficult to align with the required precision. No fully satisfactory, inexpensive method of splicing has been demonstrated. Stringent requirements with respect to outgassing limit the bonding materials that can be used to join the ends of a foil strip to be used in a cryocooler application.

Pulse tube refrigerators are simpler and potentially more useful and reliable than Stirling cycle or Gifford-McMahon refrigerators. Their pulse tubes need not be perfectly round, which makes them less expensive to construct. However, in the prior art linear orifice pulse tube refrigerator shown in FIG. 3A, the cold heat exchanger is located between the pulse tube and the regenerator. The warm heat exchanger and aftercooler are at the far ends of the pulse tube and regenerator, respectively, leaving the cold part in the middle of the assembly. That arrangement is awkward for many potential cooling applications.

Figure 3A:
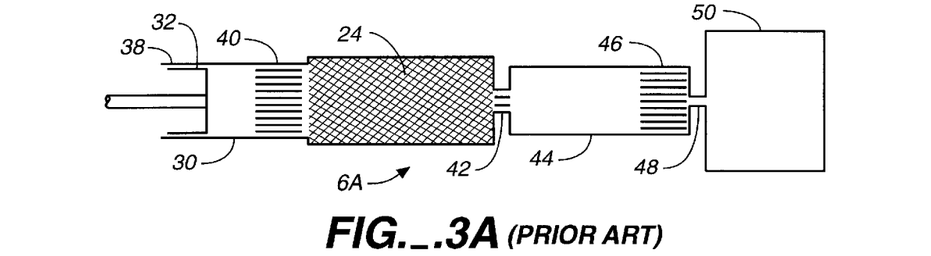
FIG. 3A is a schematic view of a prior art linear pulse tube refrigerator.
Figure 3B:
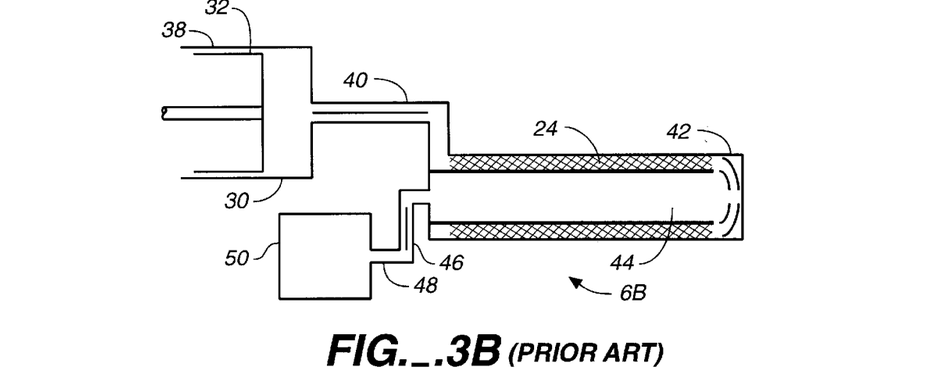
FIG. 3B is a schematic view of a prior art coaxial pulse tube refrigerator.

The geometry of the pulse tube refrigerator can be improved by placing the pulse tube inside the regenerator to create a coaxial pulse tube refrigerator according to prior art as shown in FIG. 3B. A coaxial pulse tube refrigerator is similar in shape to the cold finger of a Stirling cycle or Gifford-McMahon cryocooler. That similarity of form and function facilitates substitution of pulse tube refrigerators for Stirling cycle and Gifford-McMahon refrigerators in their many applications.

A disadvantage of coaxial pulse tube refrigerators is that they are hard to build. A major problem with construction of co-axial pulse tubes is in installing a regenerator in the annulus between the outer housing and the smaller pulse tube inside it. The regenerator must fill the annulus completely, with material of uniform geometry, in order to obtain satisfactory thermodynamic performance.

According to prior art, the housing and pulse tube of a coaxial pulse tube refrigerator are machined from tubing or bar stock to appropriate wall thickness. The pulse tube may be fabricated from insulating material to limit cross-flows of heat between pulse tube and regenerator, which typically display different temperature profiles over their lengths.

If the pulse tube and housing are assembled first, the regenerator material must be stuffed into the annulus afterwards. If the regenerator is to be made of stacked screens, they must be cut with accurate center holes and threaded over the pulse tube before being carefully and uniformly forced into the annulus between housing and pulse tube. Alternatively, the regenerator may be assembled first in its housing; the pulse tube must then be forced through the holes in the screens, which is difficult to accomplish without damage. In either case, preparing the screens with accurate center holes is difficult and expensive.

If the regenerator material is random fiber, it must be packed uniformly in a deep, narrow annular channel between housing and pulse tube. That requires painstaking labor, and it is difficult if not impossible to inspect the resulting regenerator for uniformity.

If the regenerator material is foil, its uniformity may be insured by inspection before it is installed. A spiral strip of foil may be wrapped around the pulse tube before the pulse tube is inserted into the housing. However, foil sufficiently fine to be effective regenerator material for cryocooler applications is delicate and the friction between the outer layer of foil and the inner wall of the housing can damage the foil if the fit is tight. If, however, the outer diameter of the foil regenerator is small enough to allow it to be inserted into the housing without risk of damage, it is difficult to obtain the tight fit necessary to eliminate preferential flow paths that seriously impair performance. This problem is exacerbated by the unevenness of the diameter of the wrapped foil due to the discontinuities at the inner and outer ends of the foil strip.

OBJECTS AND ADVANTAGES

Several objects and advantages of this invention are:

(1) To provide a high performance foil regenerator for use in gas cycle machines.
(2) To provide easily-fabricated elements from which foil regenerators may be assembled.

(3) To provide an inexpensive, easily-assembled foil regenerator.
(4) To provide a foil regenerator with self-adjusting elements that insure a tight fit to housing walls.
(5) To provide a method of installing high-performance annular foil regenerators for gas cycle machinery.
(6) To provide an easily-fabricated pulse tube for use in a coaxial pulse tube refrigerator.
(7) To provide a coaxial pulse tube refrigerator with a tightly-fitted foil regenerator.
(8) To provide an inexpensive, easily-assembled coaxial pulse tube refrigerator.
(9) To provide a high performance foil regenerator for use in a coaxial pulse tube refrigerator.

Further objects and advantages will become apparent from a consideration of the ensuing description and drawings.

REFERENCE NUMERALS IN DRAWINGS 2 gas-cycle machine with annular regenerator (FIG. 1)
4 regenerator in displacer (FIG. 2)
6A linear pulse tube refrigerator (FIG. 3A)
6B coaxial pulse tube refrigerator (FIG. 3B)
8 spiral-wrapped foil regenerator (FIG. 4)
10 corner of a piece of regenerator foil (FIG. 5)
12 concentric foil regenerator (FIGS. 6A, 6B)
14 sheet of regenerator foil (FIG. 7)
16 foil rolling apparatus (FIG. 8)
18 foil insertion (FIG. 9)
20 inserted foil (FIG. 10)
22 foil installation apparatus (FIG. 11)
24 regenerator
26 housing
27 expansion space
28 displacer cylinder
29 displacer
30 compression space
32 piston
34 displacer rod
36 port
38 compressor
40 aftercooler
42 cold heat exchanger
44 pulse tube
46 warm heat exchanger
48 orifice
50 reservoir
52 strip
54 slit
56 spacer-strap
58 flow channel
60 foil
61 regenerator foil
62 smooth foil
64 mandrel
65 gap
66 central opening
68 butt joint
70 open joint
71 axial edge
72 cut axial edge
73 solid axial edge
74 generally cylindrical space
76 mounting block
78 rubber-coated rod
80 tube
82 semi-cylindrical channel
84 shoulder
86 inlet tube
88 flange
90 bead
92 collar
94 inflatable bladder
96 perforated probe
98 supporting post
99 flange

SUMMARY

This invention provides for regenerators comprising separate, concentric layers of regenerator foil and a method for the creation of regenerators for gas-cycle machines, and, in the case of a pulse tube refrigerators, of the pulse tubes inside them, by sequentially inserting a series of layers of concentric foil inside a generally cylindrical housing. Each piece of foil is cut to a length approximately equal to the circumference of the space into which it is to be fitted. In the case of a coaxial pulse tube refrigerator, the outer layers of foil are regenerator foil while the innermost layers are smooth-surfaced and unperforated; they form the pulse tube itself. In the process of assembling the regenerator, each piece of foil, in turn, is loosely rolled with axial edges slightly overlapping, and inserted into the space. Each piece of foil, in turn, is pressed outward until its both of its axial edges move into place against the wall of the space, creating a joint without overlap. The radial position of the joints is distributed to prevent concentration of consecutive joints in any single part of the regenerator.

Definitions

For purposes of this patent, "foil" means sheets of material that are thin relative to their other dimensions and includes sheets of plastic or paper material as well as metal foil. "Regenerator foil" means foil that has an uneven surface such that, if a piece of regenerator foil were placed between two unperforated flat plates, fluid could flow between the flat plates through channels lying between a flat plate and a surface of the piece of regenerator foil. "Smooth foil" means foil of substantially uniform thickness with substantially smooth surfaces on both sides. "Open joint" means a location at which two axial edges of a piece of foil almost meet each other but do not touch. "Unbonded butt joint" means a location at which two axial edges of a piece of foil meet each other and touch at at least one point of contact. "Axial edge" of a piece of foil means an edge that is approximately parallel to the axis of a generally cylindrical space wherein the piece of foil is installed. "Generally cylindrical space" means a space with a circular, oval or egg-shaped cross section, a straight axis and a uniform circumference, such that if its inner surface were cut and unrolled, the surface would be flat and rectangular in shape. A space with a circular, oval or egg-shaped cross section at either end or at both ends could be a "generally cylindrical space."

Description—FIGS. 1–11

Figure 1:
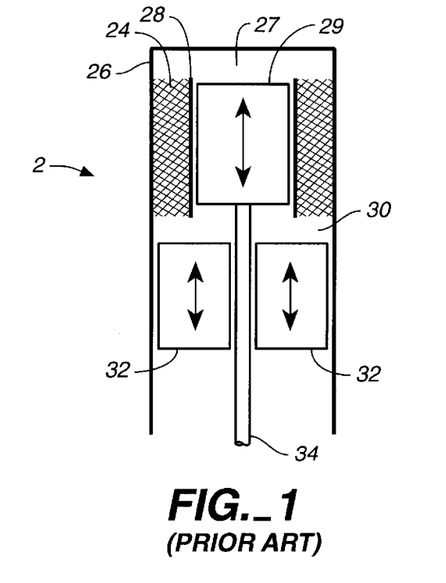
FIG. 1 is a schematic view of a prior art gas cycle machine with a regenerator surrounding the displacer cylinder.

FIG. 1 is a schematic illustration of a prior-art gas cycle machine in which a displacer 29 driven by a displacer rod 34 moves back and forth in a displacer cylinder 28 moving fluid between an expansion space 27 and a compression space 30 through a regenerator 24 which surrounds displacer cylinder 28. A piston 32 moves out of phase with displacer 29. A housing 26 acts as a pressure vessel to contain the fluid. Although piston 32 is shown, alternate methods of generating cyclically varying pressure, such as a valved compressor, are equivalent. Although displacer 29 is shown as driven by displacer rod 34, alternate methods of moving displacer 29, including linear electric drives and pressure differences resulting from pressure drop through generator 24 are known to the art, and are equivalent. As fluid flows back and forth through regenerator 24, it leaves heat in the regenerator material as it flows in one direction and picks up heat from the regenerator material as it flows back in the other direction. The material of the regenerator must be porous to permit fluid to flow, and the size and shape of the flow passages determines both the effectiveness of heat transfer between regenerator material and fluid and the the amount of pressure drop experienced by the flow.

Figure 2:
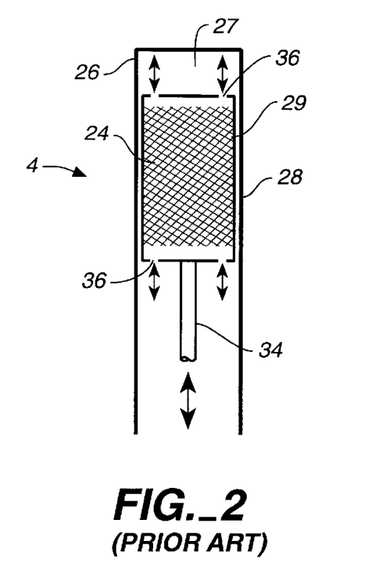
FIG. 2 is a schematic view of a prior art regenerator in a displacer.

FIG. 2 is a schematic illustration of a prior-art displacer arrangement with regenerator 24 contained in displacer 29. Fluid contained in housing 26 is moved into and out of expansion space 27 by displacer 29. Fluid enters and leaves displacer 29 through ports 36 at each end. Although displacer 29 is shown as driven by displacer rod 34, alternate methods of moving displacer 34, referenced above, are equivalent.

FIG. 3A is a schematic illustration of a prior-art linear pulse tube refrigerator. Compressor 38 forces fluid into and out of other components of the refrigerator including aftercooler 40, regenerator 24, cold heat exchanger 42, pulse tube 44, warm heat exchanger 46, and orifice 48 through which fluid passes into and out of reservoir 50. A linear pulse tube refrigerator can also be bent back on itself at the cold heat exchanger in a "U" configuration (not shown) with pulse tube and regenerator side-by-side. Although compressor 38 is shown with piston 32, alternate methods of generating cyclically varying pressure, such as a valved compressor, are equivalent.

FIG. 3B is a schematic illustration of a prior-art coaxial pulse tube refrigerator. It employs the same components as the linear pulse tube refrigerator of FIG. 3A, but in a different arrangement, with flow reversing direction at cold heat exchanger 42 and pulse tube 44 passing through regenerator 24.

Figure 4:
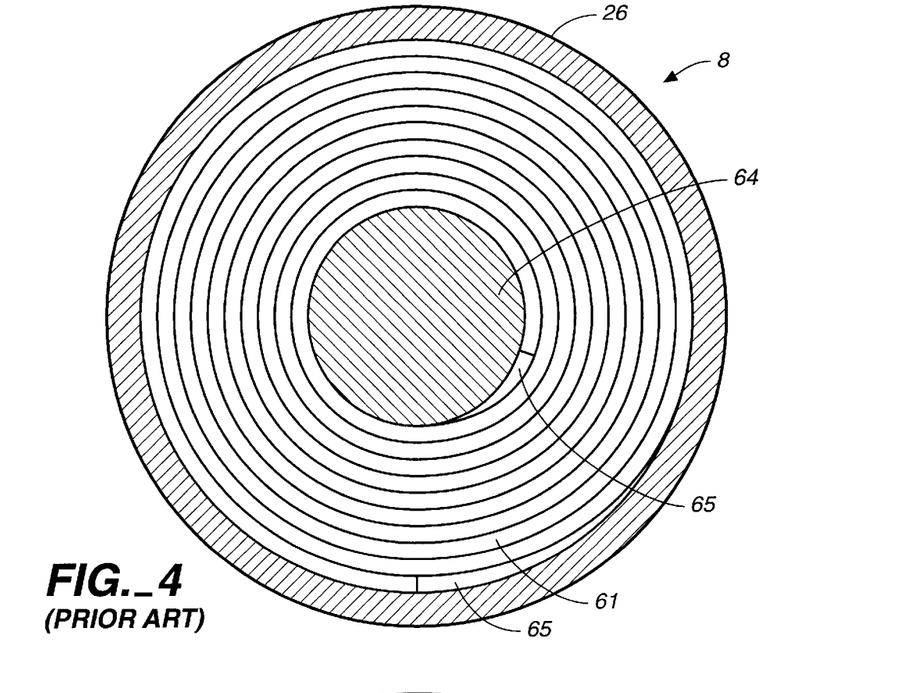
FIG. 4 is a schematic radial cross-section of a prior art foil regenerator, spiral-wrapped on a mandrel.

FIG. 4 is a schematic cross section of a prior-art spiral-wrapped foil regenerator according to U.S. Pat. No. 5,429,177. Regenerator foil 61 is wrapped around a mandrel 64 (which may be solid or may be a hollow tube that serves as a displacer cylinder pulse tube in a coaxial pulse tube refrigerator) until the outer diameter of the wrapped assembly is almost as great as the inner diameter of housing 26. The wrapped assembly of mandrel 64 and regenerator foil 61 is then inserted into housing 26 as a unit. The foil overlaps itself at the mandrel and at the housing, leaving gaps 65.

Figure 5:
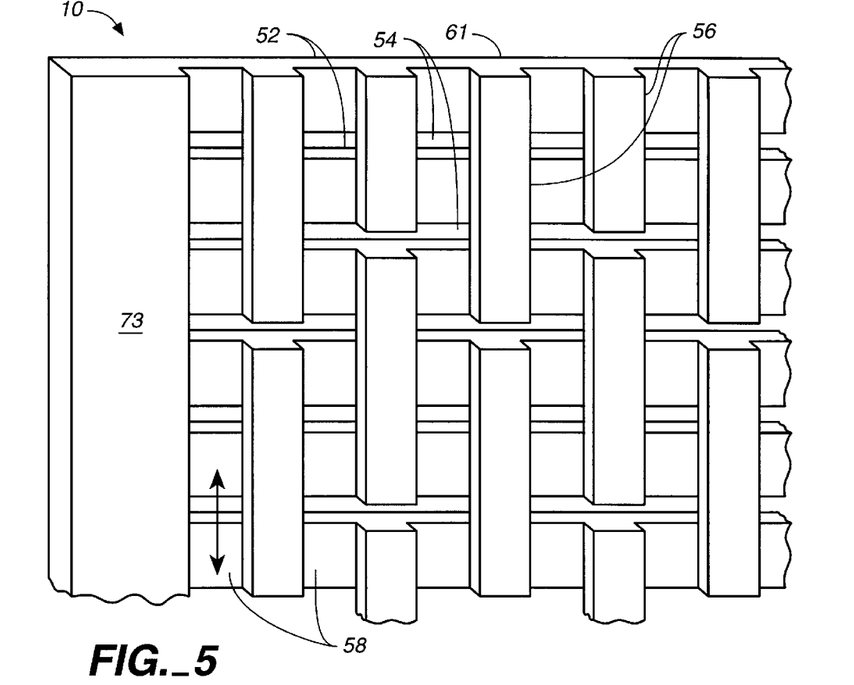
FIG. 5 is a schematic perspective view of a corner of a piece of etched regenerator foil.

FIG. 5 illustrates a corner of a piece of etched regenerator foil 10 schematically. Strips 52 and slits 54 are of the general prior art type illustrated in U.S. Pat. No. 5,429,177; they are normal to the direction of fluid flow. Spacer-straps 56 are parallel to the direction of fluid flow, defining flow channels 58. Spacer straps 56 are shown spanning two and three strips 52, but spacer-straps spanning larger numbers of strips 52 are equivalent. Solid axial edge 73 is the full, original thickness of the foil, to provide stiffness and maximum surface area on that edge, to provide a good butt joint along the whole length of the axial edge. In practice, the etching process rounds the sharp edges shown schematically in FIG. 5.

Figure 6A:
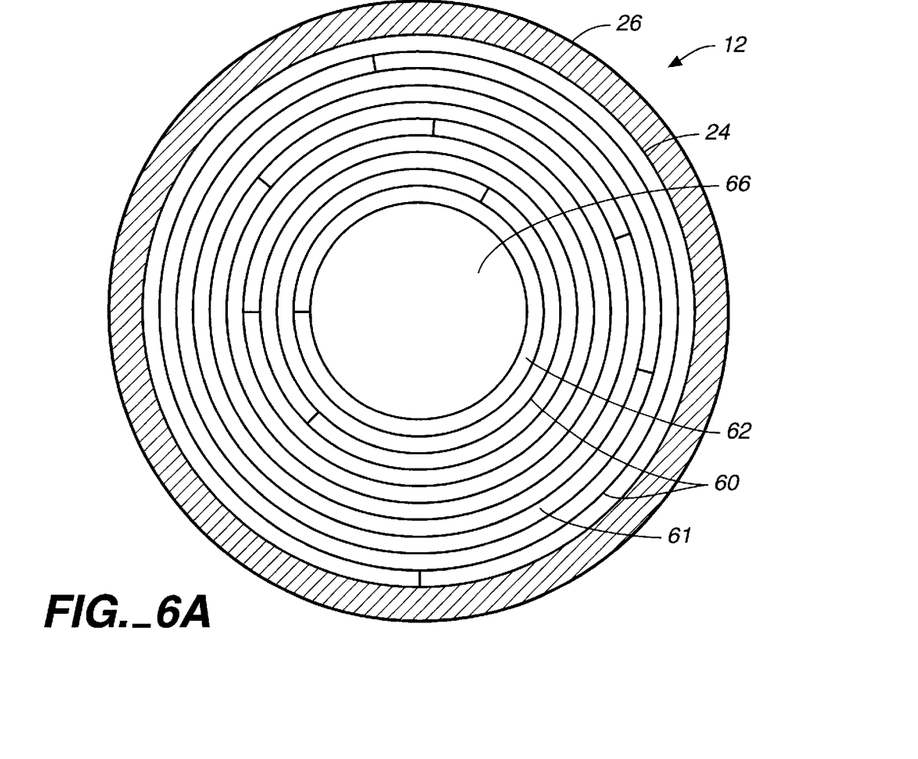
FIG. 6A is a schematic radial cross section of a concentric foil regenerator.

FIG. 6A is a cross-section of multi-layer concentric foil regenerator 12 surrounding a central opening 66, which may be filled with a solid plug or with a hollow tube that acts as a displacer cylinder 28 as shown in FIG. 1 or as a pulse tube 44 in a coaxial pulse tube refrigerator as shown in FIG. 3B. The assembly is contained in housing 26. Foil 60 is regenerator foil 61 in the outer layers and smooth foil 62 in the inner layers.

Figure 6B:
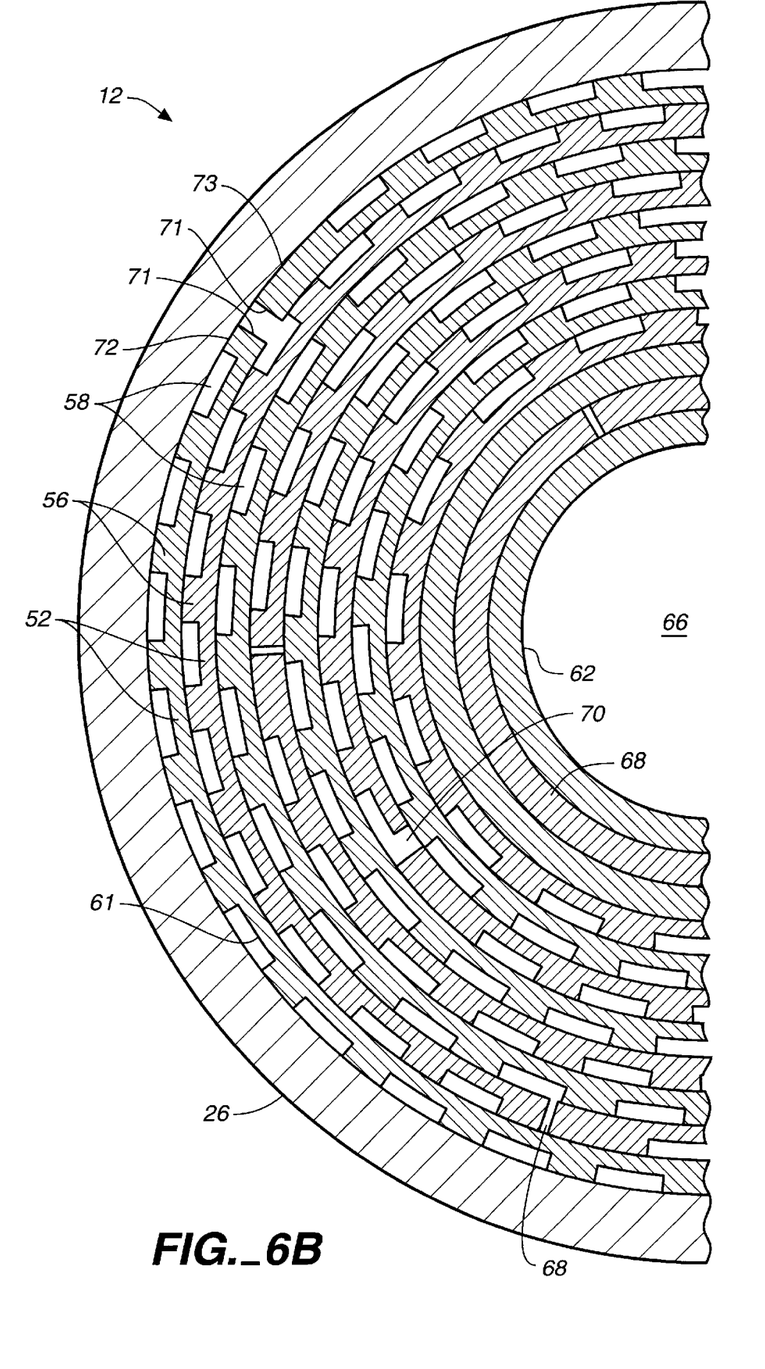
FIG. 6B is detail of a portion of the regenerator of FIG. 6A.

FIG. 6B illustrates a preferred orientation for regenerator foil 61 of FIG. 6A, with spacer-straps 56 outward. Strips 52 between spacer-straps present a smooth inner surface in the circumferential direction, easing installation of each new layer inside the previously-installed layer. Installation of a layer of foil may force a previously-installed layer apart at its joint, leaving an open joint 70. However, if each successive layer of foil is cut to length based on the thickness of previous layers and the internal circumference of housing 26, the result will be a series of butt joints 68 in successive layers.

Figure 7:
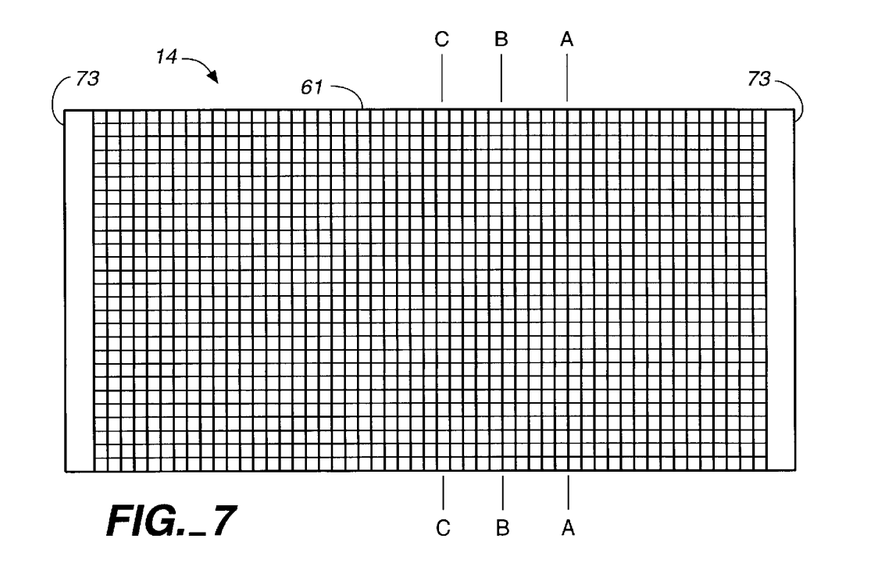
FIG. 7 is a schematic view of a piece of regenerator foil.

FIG. 7 illustrates cuts made in a piece of regenerator foil 61 with solid axial edges 73 to create shorter pieces of the correct sizes for insertion in a concentric foil regenerator. Cuts are parallel to solid axial edges 73. If the distance between axial edges 73 is equal to the sum of distances, between axial edges, of the widest and narrowest pieces to be used in the regenerator to be installed, then, if the first cut creates the longest piece needed for the regenerator, it also creates the shortest, shown as cut A—A. Subsequent cuts are closer and closer to the middle. Cut B—B creates a shorter long piece and a longer short piece; cut C—C creates pieces, almost equal in width, that fit in the middle layers of the regenerator. Each cut piece has a solid axial edge 73. From the outside working inward, each layer of foil in a concentric foil regenerator as shown in FIGS. 6A and 6B reduces the internal diameter of the remaining space by twice its thickness. Thus, each layer is shorter than the preceding layer by pi times twice the foil thickness.

Figure 8:
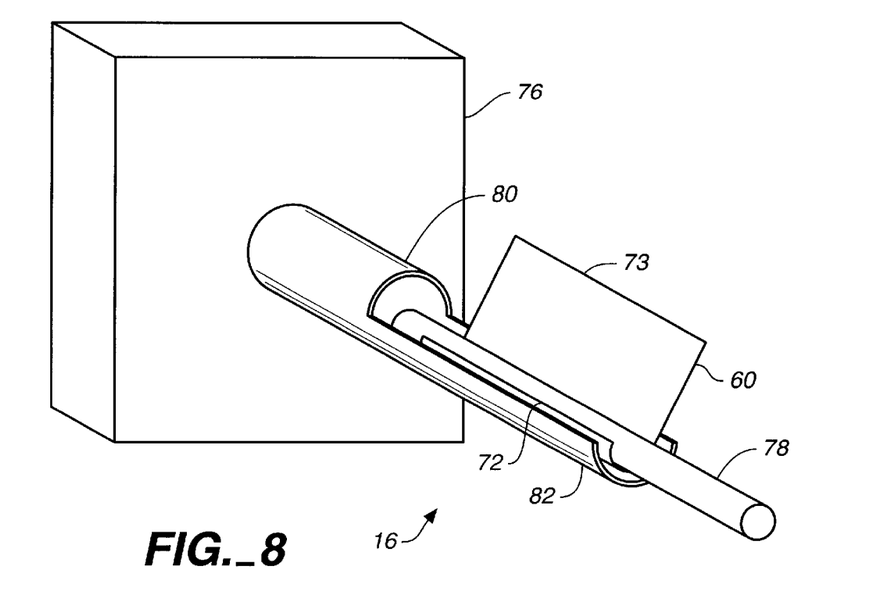
FIG. 8 is a perspective view of foil-rolling apparatus.
Figure 9:
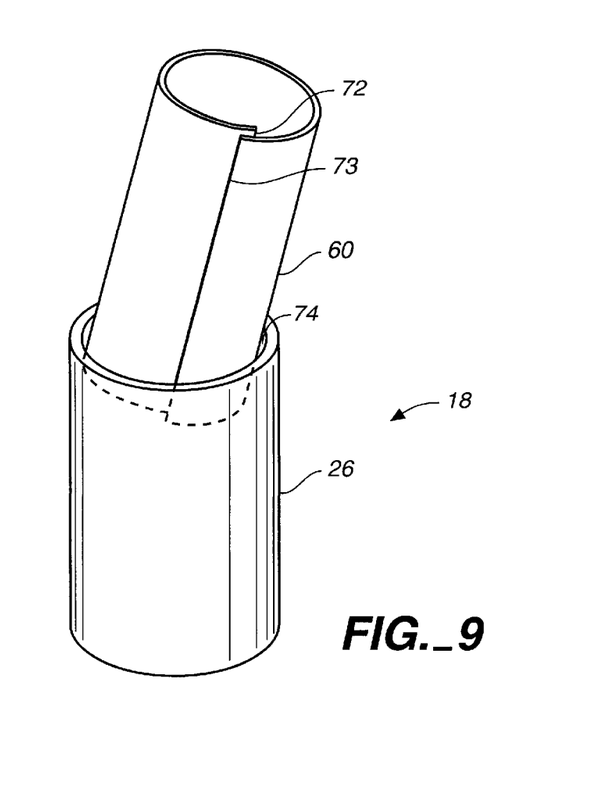
FIG. 9 is a perspective view of a piece of foil rolled for insertion into a generally cylindrical space.

FIG. 8 shows apparatus for bending foil 60 into a loose roll for insertion into housing 26 as shown in FIG. 9. Mounting block 76 shown in FIG. 8 is firmly attached to a work surface (not shown). Tube 80 is cut to create semicylindrical channel 82 and the uncut end of tube 80 is firmly attached to mounting block 76. The cut end of a piece of foil 60 is placed across semi-cylindrical channel 82 and pressed down into that channel and held in place by rubber-coated rod 78. If foil 60 is regenerator foil, cut axial edge 72 is near rubber-coated rod 78 and solid axial edge 73 is more distant.

FIG. 9 illustrates foil 60 being inserted in generally cylindrical space 74. If foil 60 is regenerator foil, solid axial edge 73 overlaps cut axial edge 72 so that the diameter of the loose roll of foil is slightly less than the diameter of the space into which it is to be inserted.

Figure 10:
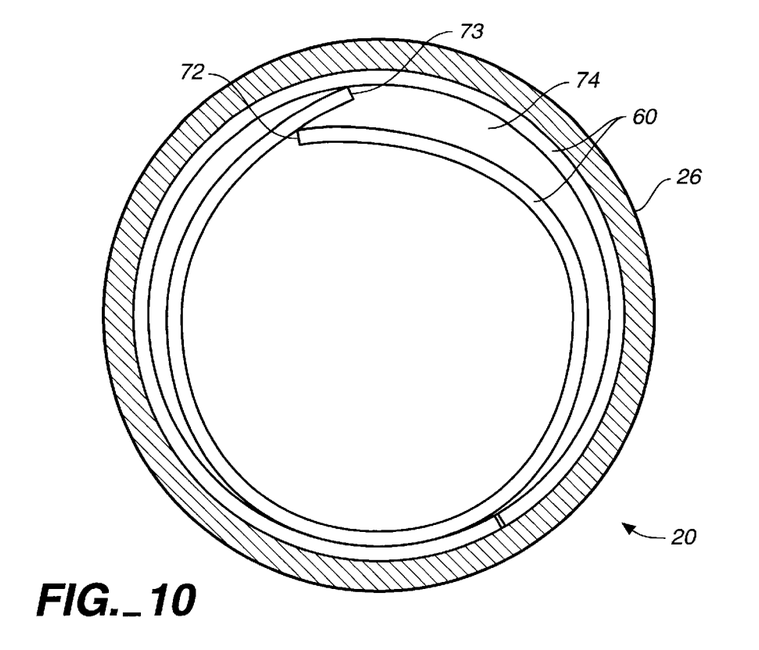
FIG. 10 is a sectional schematic view of a layer of foil loosely inserted in a generally cylindrical space.

As shown in FIG. 10, the stiffness of foil 60 causes axial edges 72 and 73 to press toward the wall of generally cylindrical space 74, pressing the middle portion of foil 60 back against the opposite wall.

Figure 11:
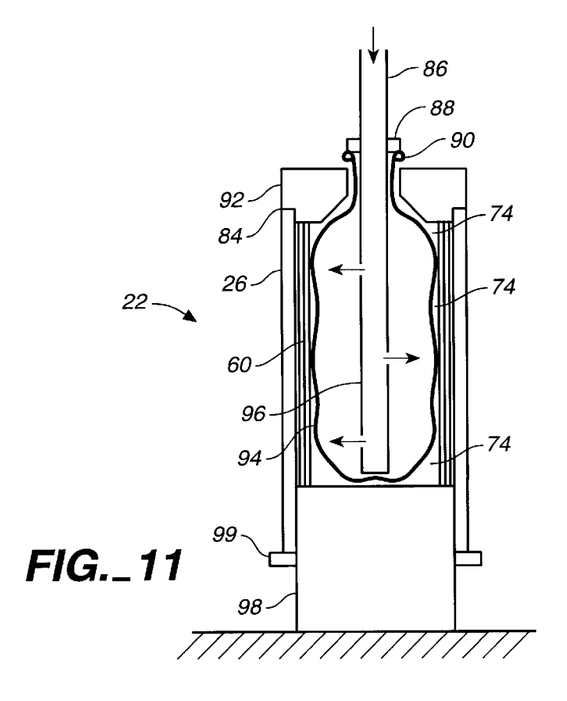
FIG. 11 is a sectional schematic view of an inflatable bladder apparatus for installing concentric foil.

FIG. 11 illustrates apparatus for a preferred method of installing foil 60. An inflatable bladder 94, such as a toy balloon, is placed inside a loose roll of foil such as is shown in FIG. 10. A perforated probe 96 holds inflatable bladder 94 in position for insertion. Inlet tube 86 is an extension of perforated probe 96. Flange 88 is integral with inlet tube 86. Collar 92 is pierced to permit inflatable bladder 94 and perforated probe 96 to pass through it with a loose fit. Shoulder 84 on collar 92 engages housing 26 to center collar 92 and housing 26 relative to each other. Housing 26 is slidably fitted over supporting post 98 and held in position on supporting post 98 by flange 99.

Operation, FIGS. 5–11

To create the concentric foil regenerator shown in FIGS. 6A and 6B, layers of foil are cut from pieces of foil such as that shown in FIG. 7. Each layer of foil, in turn, is loosely rolled by an appropriate method such as that shown in FIG. 8, inserted into a generally cylindrical space 74, as shown in FIG. 9, and released there in the position shown in FIG. 10. Each layer of foil is then pressed against the wall of the space in which it was inserted using a suitable method such as the inflatable bladder shown in FIG. 11.

To take account of the thickness of the foil used, each piece of foil is preferably cut to a length that is less than the circumference of the generally cylindrical space into which it will be installed and about equal to the circumference of the space that will remain after it is installed so that its edges will meet in a butt joint. In any event, if the gap in an open joint is not in excess of the depth of the flow channels 58 on the face of the foil, no loss of regenerative efficiency will occur. Strips 52 as shown in FIGS. 5 and 6B are to some degree flexible. Thus, pressure on the inside of a layer of regenerator foil 61 tends to force it outward between spacer-straps 56, effectively lengthening the circumference of the space into which a subsequent layer of foil is installed and insuring that the axial edges of the next-installed layer of foil can be fitted in.

For the first layer installed, the generally cylindrical space 74 is housing 26. For each successive layer, the generally cylindrical space is the inside surface of the previously-installed layer of foil. If the center of the regenerator is to be filled with a displacer cylinder, plug, or pre-machined pulse tube, one or more of the inner layers of foil may be smooth, low-friction material, such as plastic foil, in order to reduce friction and protect the regenerator foil while the cylinder, plug or pulse tube is slipped into place.

Foil may be cut by methods known to the art, including shearing with scisssors or a paper-cutter, water jet cutting, electron discharge machining and laser cutting. A positioning table known to the art may be used to hold the foil in correct position to be cut. If a cutting process that bends the cut edge is used, the bend should be outward as the foil is installed to insure that the cut edge contacts the wall of the generally cylindrical space into which it is inserted, insuring that the axial edges will meet. A cutting method that leaves a clean, straight, squared-off cut edge is preferred.

FIG. 8 shows preferred apparatus for rolling foil. The cut end of a piece of foil 60 is placed across semi-cylindrical channel 82 and pressed down into that channel and held in place by rubber-coated rod 78. If foil 60 is regenerator foil, solid axial edge 73 of foil 60 is then loosely wrapped around both semi-cylindrical channel 82 and rubber-coated rod 78. Rubber-coated rod 78 is then withdrawn from the resulting loose roll of foil and that loose roll of foil is slipped off the end of semi-cylindrical channel 82, ready for insertion into a housing as shown in FIG. 9.

FIG. 9 illustrates the method of inserting foil 60. Each successive layer of foil 60 is loosely rolled on itself. If the foil is regenerator foil, solid axial edge 73 overlaps cut axial edge 72 so that the diameter of the rolled foil is slightly less than the diameter of the space into which it is to into which it is to be inserted. The rolled foil 60 is inserted and released, so that it springs into a roughly cylindrical shape, with its axial edges still overlapped as shown in FIG. 10.

As shown in FIG. 10, the stiffness and springiness of foil 60 causes axial edges 72 and 73 to press toward the wall of generally cylindrical space 74, pressing the middle portion of foil 60 back against the opposite wall. Once foil 60 is fully inserted, it is then pressed outward against the wall of generally cylindrical space 74 along its entire length and circumference, causing both axial edges to contact wall of generally cylindrical space 74. When the pressure is released, axial edges 72 and 73 of foil 60 are butted against each other, creating butt joint 68 as shown in FIG. 6B. When a layer of foil is installed inside it, the previous layer of foil may be deformed in such a way that its edges, which were initially butted together in close contact, move apart to create an open joint 70 as shown in FIG. 6B. However, so long as each foil layer is accurately cut to length, open joints can be held to dimensions small enough to have, at most, an insignificant effect upon regenerator performance.

FIG. 11 illustrates a preferred method of installing foil 60. Inflatable bladder 94 is inflated inside a loose roll of foil 60 such as is shown in FIG. 10. Perforated probe 96 holds inflatable bladder 94 in position for insertion and introduces fluid to inflate it after it is in place. Inflatable bladder 94 and perforated probe 96 inside it pass through collar 92 with a loose fit. Shoulder 84 on collar 92 engages housing 26 to center collar 92 and housing 26 relative to each other. Housing 26 is slidably mounted on supporting post 98, which extends into housing 26 for a distance determined by placement of flange 99. Supporting post 98 forms a bottom in generally cylindrical space 74, guiding placement of foil 60 in the axial direction. When perforated probe 96 is fully inserted into housing 26, collar 92 and flange 88 clamp bead 90 of inflatable bladder 94 between them, sealing inflatable bladder 94 so that it can then be inflated by introducing fluid under pressure through inlet tube 86. When perforated probe 96 is withdrawn through collar 92, the seal at bead 90 is broken and fluid can escape from inflatable bladder 94, causing it to relax, and permitting its removal. Air is a suitable fluid for inflating inflatable bladder 94; 0.2–0.3 MPa gauge pressure (30–45 psig) is a preferred pressure range for foil approximately 50 microns (0.002") thick being installed in a generally cylindrical space about 12.7 mm (0.5") in diameter.

SUMMARY, RAMIFICATIONS AND SCOPE

Assemby of a concentric foil regenerator is easier than it might first appear. Photoetching of appropriate regenerator foil is within the state of the art. Techniques for accurately cutting foil to length, including laser cutting, are likewise within the state of the art. Although appropriate foils are very thin, their axial edges are guided to an accurate edge-to-edge joint by contact with the wall of the space in which they are installed. Using an inflatable bladder to install successive layers of foil is a skill than can be acquired in a few hours of practice. Assembly of a regenerator using 50 or 100 layers of concentric foil is potentially easier than assembling an alternative regenerator using hundreds of stacked screens. Due to the straight-through flow passages in a foil regenerator, pressure drop relative to heat transfer is less than with regenerators fabricated with stacked screens or packed particles. Foil can be fabricated with a higher proportion of material to dead volume than is possible with screens, improving thermal mass characteristics of the regenerator, thus improving performance.

An annular, concentric foil regenerator is particularly well suited for use with Stirling cycle machines in which the regenerator surrounds a displacer cylinder as shown in FIG. 1. It is at least equally well suited for use in a coaxial pulse tube refrigerator, in which the regenerator surrounds the pulse tube as shown in FIG. 3B. However, a foil regenerator for other types of regenerative gas cycle machines such as are shown in FIGS. 2 and 3A may also be fabricated by installing a solid plug in an annular foil regenerator such as is shown in FIG. 6A.

By building the regenerator and pulse tube from the outside in with layers of foil, a tight fit can be obtained between each succeeding layer, insuring uniformity of the regenerator and eliminating preferential flow paths. Building the regenerator with strips of foil equal to the circumference of the generally cylindrical space into which they fit permits the use of relatively short foil strips compared with wrapped foil regenerators. It is easier to maintain uniformity of etch depth over a short length of material than a long length, thus making manufacturing of uniform regenerator foils less expensive.

In the case of the coaxial pulse tube refrigerator, the assembly technique described permits assembly of not only the regenerator but also the pulse tube itself. The normal and intuitive way to fabricate a pulse tube is to use a tube with no open seam along its side. If the pulse tube is open to ambient pressure, as in a linear or "U" configuration of the refrigerator, the pulse tube must be strong enough to contain the entire system pressure at its peak. However, a pulse tube built up from concentric layers of foil is practical in a coaxial pulse tube refrigerator because the instantaneous pressure differences between the inside and outside of the pulse tube are relatively small. The housing typically contains pressure in the range of several MPa. The pressure fluctuation over a cycle may be a large fraction of one MPa, or more. However, pulse tube 44 and regenerator 24, as shown in FIG. 3B, are connected to each other through cold heat exchanger 42. Since regenerator 44 and cold heat exchanger 42 are normally designed for relatively small pressure drop, pulse tube and regenerator are always at almost the same pressure. As a result, the pulse tube itself is always subject to relatively equal pressures inside and out and need not withstand large pressure differentials.

While a spiral wrap of foil might also create a tube inside a regenerator, a spiral-wrap of foil would tend to open up to outside pressure, causing a severe leak. In contrast, butt joints seal more tightly as outside pressure increases. Even without bonding its edges, the arch-strength of the butt joint approaches that of a welded joint. When the higher pressure is inside, the inner layer of foil is pressed against the next layer out, intensifying the seal between layers even if the butt joint is no longer tightly compressed.

Building a pulse tube in place with successive layers of foil also offers the opportunity to introduce a relatively thick layer of insulating foil such as a polymer, between layers of other material such as stainless steel. Since the pulse tube, unlike the expansion cylinder of a Stirling cycle or Gifford McMahon refrigerator, has no solid displacer in it, perfect straightness and perfect roundness are not required. The slight discontinuity of surface finish where the edges of the innermost foil butt against each other to form the pulse tube does not significantly affect flow in the pulse tube or system performance.

The potential advantages of foil regenerators are well known. This invention improves the thermodynamic performance of foil regenerators by providing a method by which they can be installed without overlapping joints and without extra clearance to allow for assembly. This invention has particular advantages for gas cycle machinery employing annular regenerators, including coaxial pulse tube refrigerators, by improving the uniformity of regenerators and insuring continuity of contact between regenerator material and the walls of both housing and pulse tube or displacer cylinder.

Although the description above contains many specifics, these should not be construed as limiting the scope of the invention but merely as providing illustrations of some of the presently preferred embodiments of this invention. For example, FIG. 5 shows perforated regenerator foil, whereas unperforated regenerator foil can also be used. FIG. 5 shows a particular etch pattern, but various other patterns are possible and equivalent. Thus, the scope of the invention should be determined by the appended claims and their legal equivalents, rather than by the examples given.

I claim:

1. An improved regenerator comprising a plurality separate of concentric layers of regenerator foil installed in a generally cylindrical space.

2. The improvement of claim 1 wherein two edges of a layer of said regenerator foil meet each other in an unbonded butt joint.

3. The improvement of claim 1 wherein two edges of a layer of said regenerator foil approach each other in an open joint.

4. The improvement of claim 1 wherein two edges of a layer of said regenerator foil meet each other in an unbonded butt joint and two edges of a different layer of foil approach each other in an open joint.

5. The improvement of claim 1 wherein each layer of said regenerator foil has a joint and a joint in each adjoining layer is radially offset from said joint in said layer.

6. The improvement of claim 1 in combination with a gas cycle machine equipped with a displacer.

7. The improvement of claim 1 in combination with a coaxial pulse tube refrigerator.

8. The improvement of claim 1 wherein a generally cylindrical tube is disposed inside the innermost layer of foil.

9. The improvement of claim 1 wherein a solid plug is disposed inside the innermost layer of foil.

10. In a coaxial pulse tube refrigerator, an improvement comprising a plurality of concentric foil layers wherein outer foil layers are regenerator foil and inner foil layers are smooth foil.

11. The improvement of claim 10 wherein axial edges of a layer of said smooth foil meet each other in an unbonded butt joint.

12. The improvement of claim 10 wherein said inner layers of smooth foil comprise a .pulse tube portion of said coaxial pulse tube refrigerator.

* * * * *

UNITED STATES PATENT AND TRADEMARK OFFICE
CERTIFICATE OF CORRECTION

PATENT NO. : 6,745,822 B1
DATED : June 8, 2004
INVENTOR(S) : Matthew P. Mitchell It is certified that error appears in the above-identified patent and that said Letters Patent is hereby corrected as shown below:

<u>Column 4,</u>
Line 56, "outward until its both of its" is corrected to read -- outward until both of its --

<u>Column 8,</u>
Lines 17-18, "into which it is to into which it is to be inserted" is corrected to read -- into which it is to be inserted --

<u>Column 10,</u>
Lines 32-34, "1. An improved regenerator comprising a plurality separate of concentric layers of regenerator foil installed in a generally cylindrical space" is corrected to read -- 1. An improved regenerator comprising a plurality of separate concentric layers of regenerator foil installed in a generally cylindrical space --
Lines 45-47, "5. The improvement of claim 1 wherein each layer of said regenerator foil has a joint and a joint in each adjoining layer is radially offset from said joint in said layer" is corrected to read -- 5. The improvement of claim 1 wherein each layer of said regenerator foil has a joint and wherein a joint in a layer is radially offset from the joint in an adjacent layer --
Lines 60-62, "11. The improvement of claim 10 wherein axial edges of a layer of said smooth foil meet each other in an unbonded butt joint" is corrected to read -- 11. The improvement of claim 10 wherein two edges of a layer of said smooth foil meet each other in an unbonded butt joint --

UNITED STATES PATENT AND TRADEMARK OFFICE
CERTIFICATE OF CORRECTION

PATENT NO. : 6,745,822 B1
DATED : June 8, 2004
INVENTOR(S) : Matthew P. Mitchell It is certified that error appears in the above-identified patent and that said Letters Patent is hereby corrected as shown below:

Column 10, (cont.)
Lines 63-65, "12. The improvement of claim 10 wherein said inner layers of smooth foil comprise a pulse tube portion of said coaxial pulse tube refrigerator" is corrected to read -- 12. In a pulse tube refrigerator, the improvement of claim 10 wherein said inner layers of smooth foil comprise the pulse tube portion of said coaxial pulse tube refrigerator --

Signed and Sealed this

Twenty-sixth Day of July, 2005

JON W. DUDAS
*Director of the United States Patent and Trademark Office*